INVENTOR
DON F. WIDMAYER

BY Larson and Taylor

ATTORNEYS

INVENTOR
DON F. WIDMAYER

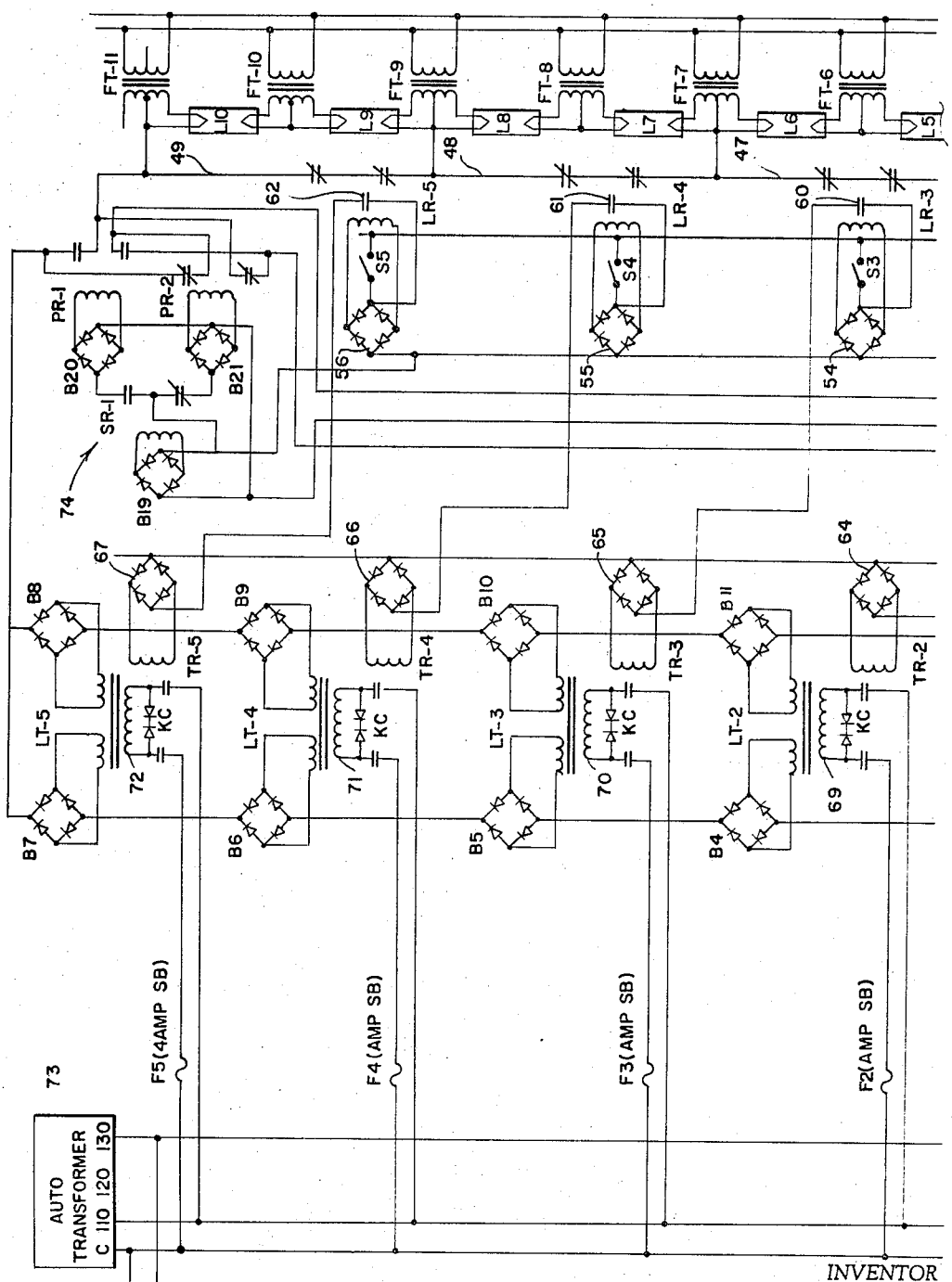

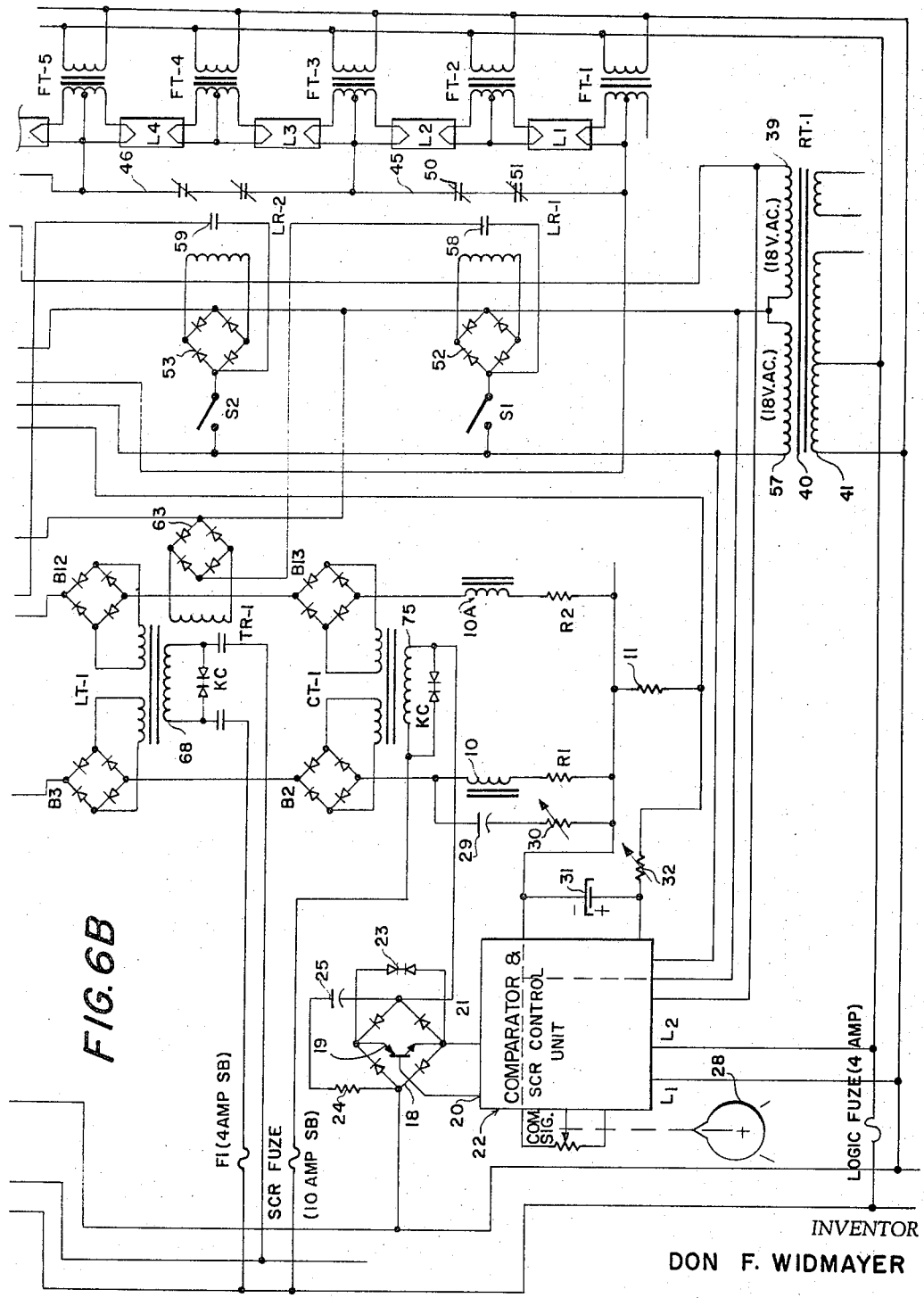

3,422,310
Patented Jan. 14, 1969

3,422,310
APPARATUS FOR CONTROLLING CURRENT TO LOAD INDEPENDENT OF LOAD CHARACTERISTICS
Don F. Widmayer, 10240 Hatherleigh Drive,
Bethesda, Md. 20014
Filed June 14, 1965, Ser. No. 463,583
U.S. Cl. 315—291                  23 Claims
Int. Cl. G05f *1/02;* H05b *37/02; 39/04*

ABSTRACT OF THE DISCLOSURE

A voltage compliance current control system is provided for controlling current supply to a load over a wide dynamic range independent of the load characteristics. Pulsating direct current supplied to the load is controlled through a feedback sensing network responsive to current flow in the load circuit and a choke coil connected in series with the full-wave rectified AC input voltage acts as an energy storage current source. The system may be used to control the bank of lamps in a plant and cell growth arrangement and lights of different spectral characteristics may be controlled thereby to vary the quantity of light in any given spectral region.

---

The present invention relates to the control of electric current, more particularly, to the control of continuous or discontinuous current to a load device independently of the electrical resistance characteristics thereof.

Most load devices are powered by a voltage source, e.g., an AC power line, which provides to any load device connected thereto a fixed voltage at a current level in accord with the ratio of the source voltage and the resistive characteristic of the load device ($I=E/R$). This law correctly implies that any load device having a net negative resistance characteristic has no inherent current limiting characteristic and will require an external means to limit the current from going to harmful levels.

The classic means for controlling the current flow through a load device to control its output is to vary the amplitude of the voltage source or the resistance of the load device. This causes the current to comply to a level in accordance with a changed $E/R$ ratio or, alternatively, rapidly switch the power to the load on-off-on-off by applying full voltage or no voltage for various time increments. The higher then on-to-off ratio, the greater the average power flow to the load. This method of control is carried out at a sufficiently high frequency so that the load responds to the average current value and in AC circuits is sometimes called "AC phase control." It is extensively used in solid state circuits employing silicon control rectifier types of devices.

While these three described methods of current control are useful, they have unique as well as common disadvantages. For example, the current and, hence, the load device output will vary with occasional fluctuations in the voltage source which may occur between low and peak power consumption periods. Furthermore, the use of resistive elements to limit and to adjust the current is inefficient and often consumes as much or more power than the primary load device. The use of on-off switching for an average current value method of control is the most efficient of the methods discussed, but does not compensate for primary voltage source variations among other shortcomings.

The disadvantages of these methods of control become even more obvious and limited in the case of the family of devices that depend upon gaseous discharge phenomena such as neon, fluorescent, mercury and other types of arc lamps, furnaces, welders as well as other gaseous arc devices. FIGURE 1 is from pages 4–174 of the book entitled "Handbook of Physics" by Condon and Odishaw. The text, adjacent to the figure, cites the figure as being from "Druyvesteyn & Penning (Op. Cit., p. 89)." While the phenomena of the conduction of electricity through gases lacks a simple and rigorous definition, FIGURE 1 illustrates a volt-ampere characteristic of a typical gas discharge. An examination of FIGURE 1 shows that for the same voltage level (e.g., 50% point on the vertical voltage coordinate) that the current could be either zero or one of three values. Further analysis shows that between points E and F and from K onward the current may differ for the same voltage level. This indicates a changing resistive characteristic while the curve in general indicates that the resistive characteristic is grossly nonlinear and negative in character over the majority of the current range shown. This means that the classic control methods described above are limited to controlling the arc current over relatively narrow ranges, if they are useable at all.

One form of such a load device which, as far as is known, has never been controlled satisfactorily is the fluorescent lamp. This type of lamp is representative of devices utilizing gaseous discharge phenomena to achieve a lumen output. The particular problem involved in fluorescent lamps is to control the intensity of illumination therefrom.

The fluorescent lamp and other gaseous arc types presents an almost infinite resistance between its cathodes until sufficient voltage is applied to strike an arc. Then, as in all gas discharge phenomena, the arc path takes on a negative resistance characteristic which increases with current flow in the arc discharge region. Hence, if a voltage sufficient to strike the arc were applied to a fluorescent lamp, as might be applied to a filament lamp, the current through the arc would attempt to go to infinity, having a deleterious effect on the lamp. Therefore, ancilliary equipment called "ballast" is required with gaseous arc discharge lamps whose primary function is to limit the current through the arc.

In AC operated gaseous discharge lamps an inductive choke is employed in its ballast. Also other circuitry and components are employed to provide for the higher starting than sustaining voltage required and the cathode heater voltage when independently heated cathodes are used. In AC operated gaseous arc discharge lamps the arc goes discontinuous at twice the AC power frequency. Therefore, on 60 cycle power operation the lamp develops a 120 c.p.s. light fluctuation. Generally, the light fluctuation is not perceptible to the eye but on occasion appears to cause some noticeable flickering or spiraling effect which is also related to operation at lower temperatures or in drafts. Further, the conventional ballast requires an optimum line voltage. A ballast designed to operate on a 120 volt circuit will generally operate up to 125 volts without causing overheating and as low as 110 volts without causing flicker or starting difficulties or reduced lamp life due to the reduced cathode voltages and other factors. In addition, the 120 c.p.s. fluctuation, while not visible to the eye, causes a stroboscopic phenomena observable or rapidly moving or rotating objects. Also, the arc going discontinuous at twice the power frequency causes RF radiation requiring interference suppressors.

Gaseous arc discharge lamps can also be operated on direct current and in a conventional application a resistor is used to limit the current along with a choke type ballast to supply an inductive voltage "kick" for starting the lamp. The main disadvantage of DC operation is that the resistance-ballast consumes roughly the same power as the lamp, thus making conventional DC operation considerably less efficient than conventional AC operation. The problems of RF interference, strobe effects, fluctuation, flicker and spiraling effects due to the line frequency fluctuation are not present in DC operation.

Thus, the gaseous arc lamp requires an arc sustaining voltage and the rapid change from an almost infinite-positive from "off" position to a negative resistance characteristic to "on" position precludes a wide range of control by simple voltage variation. Lowering the voltage will first cause severe flicker and then extinguishment. To maintain maximum sustaining voltage "on" time, conventional AC ballasts attempt to modify the AC sine wave input power to an AC square wave character, otherwise the "on" time would be even shorter since it is being confined to the time period the AC wave peak exceeded the sustaining voltage level required.

Another more widely used technique for controlling the lumen output of gaseous arc discharge lamps and also used to control incandescent types is the use of the silicon control rectifier and accompanying circuitry to drive the lamp "on" over only a portion of the primary AC power source wave form. This mode of operation will extend, but still to a limited extent, the dimming range of gaseous arc lamps. In the case of a gaseous arc lamp controlled by an SCR control circuit, the total lamp power is generally controlled and perceptible flicker begins to become apparent when the SCR "off" time begins to exceed the SCR "on" time. In either voltage amplitude change control or conventional SCR type of control the lumen output will follow line voltage variations and changing lamp characteristics. A further problem in conventional controlled gaseous discharge type lamps is that the lumen output decreases, rapidly at first, with operating lamp life.

It is therefore the principal object of the present invention to provide an apparatus and method for converting an AC voltage (current compliance) source into a current (voltage compliance) source and control the current flow to a load device independent of electrical resistance characteristics of the load device or primary power supply fluctuation.

It is an additional object of the present invention to provide an apparatus and method for controlling the arc current through a load device dependent upon gaseous discharge phenomena over a widely adjustable operating range utilizing a continuous or discontinuous arc current and while controlling only a portion of the power required to operate the load.

It is a further object of the present invention to provide an apparatus and method for varying the output of a load device independently of primary power supply fluctuation or changing characteristics of the load device due to temperature or aging effects.

It is another object of this invention to provide a method and apparatus for varying the average spectral energy distribution of a plurality of gaseous arc discharge lamps over an adjustable lumen output range while controlling only a fraction of the power required to operate the lamp bank.

It is a still further object of this invention to provide a method and apparatus for controlling the current through any load device by operating the device from a current source-voltage compliance system as opposed to the more conventional approach of operation from a voltage source-current compliance system.

The objects of the present invention are attained and the disadvantages of the prior art, as discussed above, are eliminated by the electrical control system disclosed herein.

The present system essentially comprises a means for controlling the current to a load device such as a gaseous arc lamp which may be operated with continuous current (DC). A polarity reversing switch structure has one side connected across the lamp. The other side of the polarity reversing switch is connected across a pair of series connected full wave rectifier bridges. An energy storage choke coil is also in series with the two bridges. A first transformer has its primary connected across an AC source and its secondary across one of the rectifier bridges. This transformer and rectifier supplies to the lamp a quantity of power which is just below the level of power required to sustain the arc in the lamp. This power is uncontrolled in that it originates from the AC source.

A second transformer is provided which has its primary connected to the AC source through a silicon control rectifier circuit and its secondary across the other of the two rectifier bridges. A control unit is connected across an AC source and has its output connected to the silicon control rectifier which controls the AC power supplied to the primary of the transformer. The power supplied by both transformers is added and supplied to the choke in series with the (2) bridges and the lamp. To vary the arc current and hence illumination of the lamp it is only necesary to control that portion of the power supplied through the second transformer.

A feedback signal sensing network is in electrical circuit relation with the choke and connected to the control unit in order to regulate the power supplied to the second transformer in response to the current flow in the lamp circuit.

A second feedback circuit responsive to the light or temperature output of the lamp may also be provided to control the power supplied to the second transformer in response to the light or temperature output of the lamp.

In order to operate the lamp on AC or a discontinuous current the two full wave rectifiers, the choke and the polarity reversing switch are eliminated and the transformers used should have a square wave output characteristic.

With modifications to be presently described, this system can also operate a plurality of lamps in a particular sequence or selected lamps can be operated at desired levels of illumination. Further, by a suitable input in the control unit, the lamps may be periodically switched on-off (flashing) over an adjustable frequency and/or according to a desired cycle.

Other objects and advantages of the present invention will be apparent upon reference to the accompanying specification when taken in conjunction with the following drawings wherein:

FIGURE 6 is an electrical circuit diagram showing schematically an arrangement for controlling selectively a plurality of gaseous arc lamps.

Proceeding next to the drawings wherein like reference symbols indicate the same parts throughout the various views, a specific embodiment of the present invention together with several modifications thereof will be described in detail.

Figure 3:
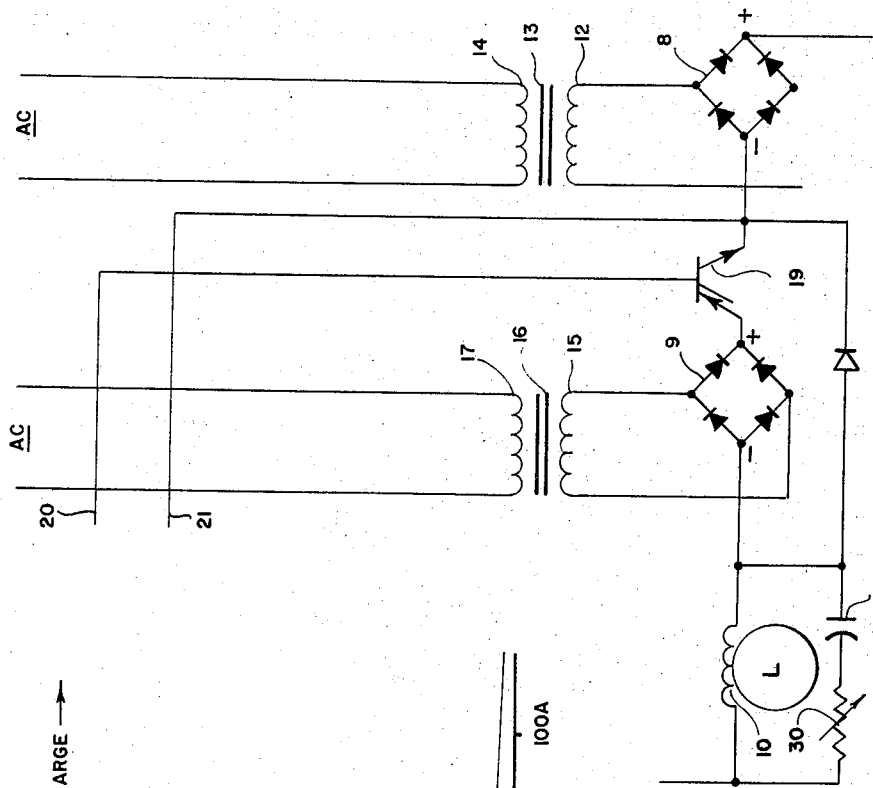
FIGURE 3 is a portion of the circuit of FIGURE 2 showing a modified circuit for controlling the controlled power.
Figure 1:
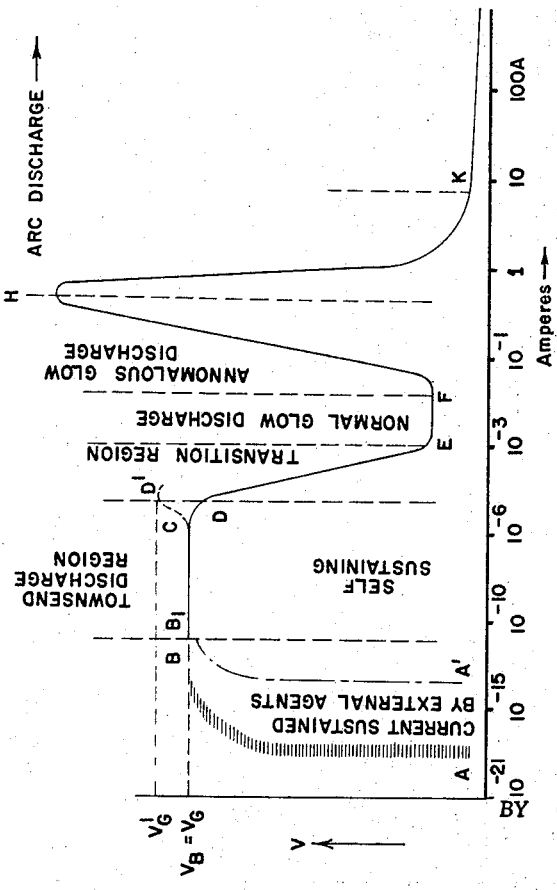
FIGURE 1 shows graphically the volt-ampere characteristic of a typical gas discharge device.
Figure 2:
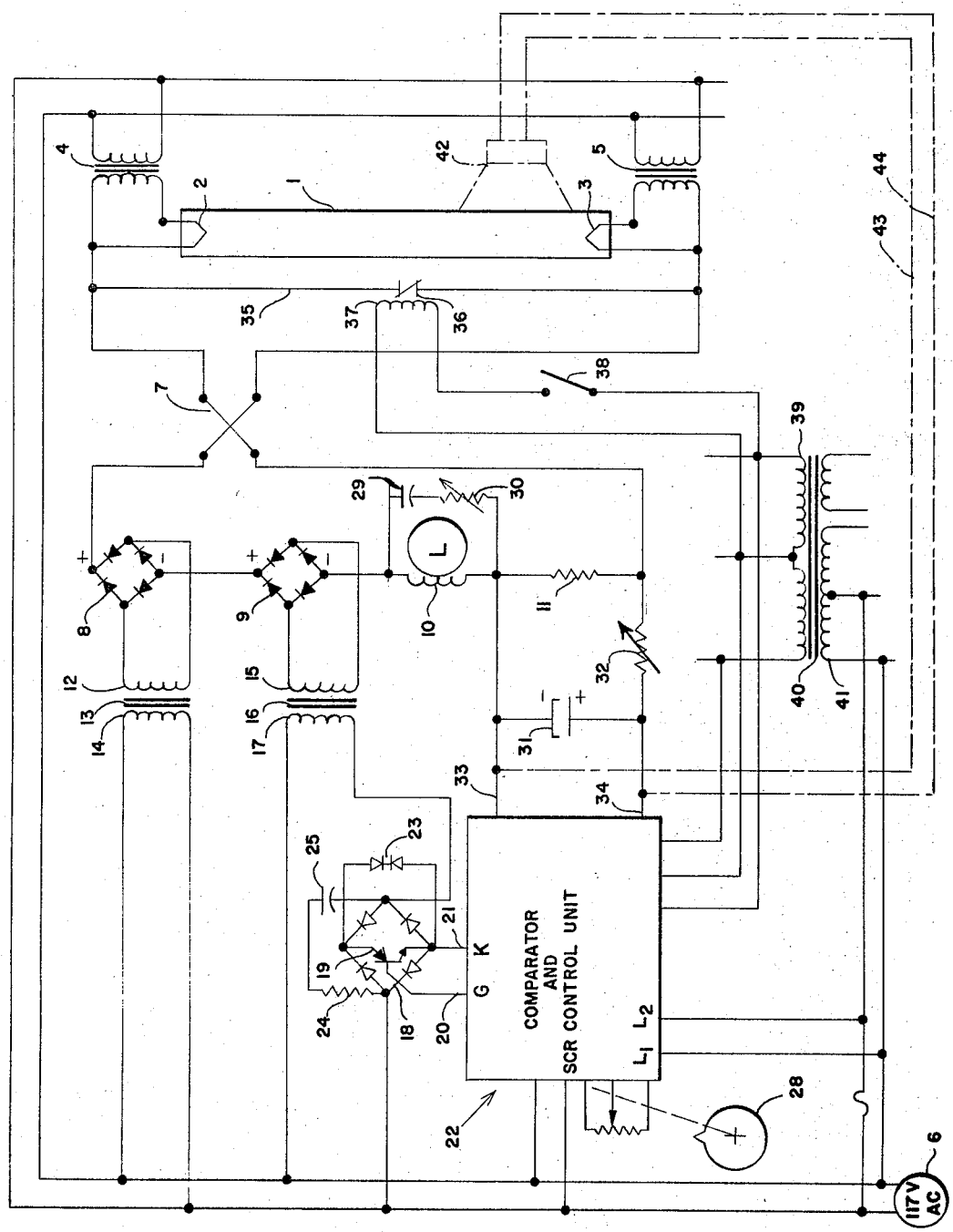
FIGURE 2 is an electrical circuit diagram showing schematically the present invention for controlling electric current to a gaseous arc lamp.

With particular reference to FIGURE 2, the load device in which the electric current is to be controlled, is a gaseous arc lamp 1 which is of the rapid-start, hot cathode type, and having cathode filaments 2 and 3 independently heated by transformers 4 and 5, both of which are connected across an AC source 6. The lamp is connected across one side of a polarity-reversing switch arrangement 7.

Since in this circuit the current through the lamp 1 is DC, the current polarity reversing switch 7 is provided to prevent the mercury vapor from migrating to one end of the lamp which would cause premature end darkening and to equalize cathode wear.

Connected across the other side of the polarity-reversing switch 7 are a pair of serially-connected full-wave rectifier bridges 8 and 9, a choke coil 10, and a resistor 11. Each rectifier bridge 8 and 9 comprises four half-wave rectifiers which are connected in a bridge arrangement as is well known in the art to provide full wave rectification. The other side of the bridge 8 is connected to the secondary winding 12 of a transformer 13 which has a primary 14 connected across AC source 6. Thus, the power supplied to the bridge 8 is directly from the AC source and, accordingly, is not subject to any selective control.

The bridge 9 similarly has a side connected to a secondary winding 15 of a second transformer 16 which has a primary 17. The primary 17 has one side directly connected to the AC source 6 and the other side connected to the AC source through a full wave bridge 18. The full wave rectifier bridge 18 has a silicon control rectifier 19 connected across its other side in order to control the power supplied to the primary 17 and transformer 16. The gate and cathode of the SCR 19 is then connected across the output supplied from the control unit 22. An International Rectifier "Klip-Cel" 23 is connected across the bridge 18 in parallel with the SCR 19 to filter out transients that might damage the SCR. A resistance 24 and a capacitor 25 are connected across the other side of the bridge 18 to act as a network to insure that the SCR recovers at least as fast as the diodes in the bridge 18.

Figure 5:
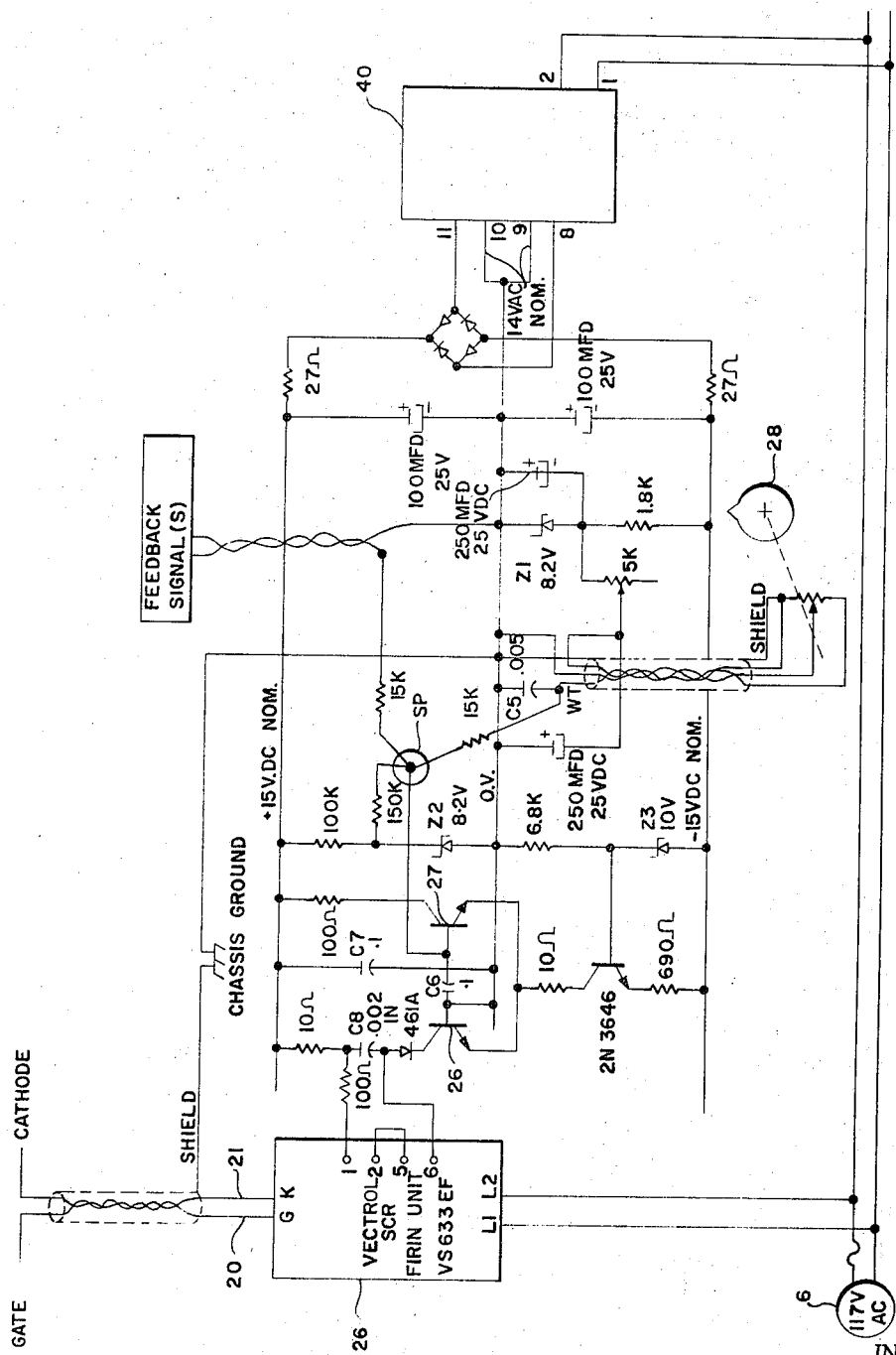
FIGURE 5 is an electrical circuit diagram showing schematically the control unit shown in the circuit of FIGURE 1.

The control unit 22 is illustrated in greater detail in FIGURE 5 and comprises a suitable SCR firing unit such as the Vectrol SCR firing unit VS–6332 EF indicated as 26 and which is connected across the AC source 6 at L1 and L2. The additional circuitry of the control unit 22 is as illustrated in FIGURE 5 and includes 26 and 27 which are the two matched transitors of a 2N2910 differential amplifier. The control unit 22 is further provided with a dial potentiometer indicated at 28 for controlling the current therein.

Referring to FIGURE 2, the resistor 11 acts as a current level sensing resistor and together with capacitor 29 and resistor 30, which is in circuit relation with the choke 10 and functions to sense the rate of current change of current, forms a feed back signal sensing network. Capacitor 31 and resistor 32 serve as a filter for the feed back signal which is fed into the control unit 22 by the leads 33 and 34.

A current path 35 is provided across the lamp 1 and includes a normally closed contact 36 actuated by a relay coil 37 in circuit with a switch 38 and connected across a winding 39 of a transformer 40 which provides a low voltage power source for the control unit and relay. The transformer 40 is an RT 202 Stancor Transformer. The primary of the transformer 40 is indicated at 41 and is connected across the AC source 6. In addition to the normally closed contact 36, a normally open contact (not shown) may also be provided at the relay coil 37 to connect the AC source 6 to the transformer 13 only when the relay coil 37 is energized.

A photoelectric or temperature sensor 42 is positioned adjacent the lamp 1 so as to be responsive to the lumen output or bulb temperature thereof and is connected to the control unit 22 through leads 43 and 44 to define a second feed back variable. Accordingly, if the lumen output of the lamp 1 decreases with age due to changing lamp characteristics the photoelectric sensor 42 could advance the current in the control unit 22 to maintain a constant light level of the lamp 1. Alternatively, if the sensor 42 were temperature sensitive, then the arc current could be controlled as a function of temperature or a combination of light and temperature. In this connection it is pointed out that the load device as indicated by the lamp 1 could be an incandescent lamp or other type of load device, a plurality of fluorescent lamps, or combinations of fluorescent lamps and incandescent lamps or other load devices.

The lamp 1 essentially derives its power from the choke coil 10 which acts as an integrator or energy storage current source. It is apparent that if a load device were connected to a choke containing stored energy the device would act as a load and while the stored energy lasted, the current would seek a compliance level. If the energy level started to drop because of the load drawing power from this power reservoir, the current would also drop. This would then imply that if the current is to be maintained, some means must be provided for constraining the current flow in the load circuit as well as some means for replenishing the stored energy being drawn from the power reservoir choke coil 10.

The primary path of the load circuit runs from the top end of the choke coil 10, through the full wave rectifier bridges 8 and 9, through the polarity reversing switch 7 to the lower cathode 3 of the lamp 1 and then through the lamp to the upper cathode 2 so as to return to the polarity reversing switch 7, then through the resistor 11 and to the lower end of the choke coil 10.

In order to describe the operation of this circuit in controlling the current through a load device, it is presumed for the moment that the transformer 13 and bridge 8 are removed from FIGURE 2 and the plus side of bridge 9 is connected to the polarity reversing switch 7. The control unit functions to establish the current flow through the load circuit as described above. Referring again to FIGURE 5, potentiometer 28 generates a current which is fed to a sum point, SP in the control unit where this current is algebraically summed with the current feed back signals generated by the current feed back network (29, 30 and 11) and/or a photoelectric or temperature sensing device indicated at 42. If the input signal exceeds the feed back signal the firing angle of the SCR 19 is advanced to increase the SCR "on" time and hence to increase the power flow to the primary 17 of the transformer 16. The secondary output rectified by the full wave bridge 9 is increased thereby providing more power to the energy storage choke 10. This brings about an increase in current flow in the load circuit and a related increase in the light of the lamp 1 or other output variables in a load device. With this increase in current in the load circuit, an increased feed back signal results. When the feed back signal exceeds the input potentiometer signal, the firing angle of the SCR is retarded which results in less power flowing to the energy storage choke 10 and accordingly brings about a lower level of power flow in the load circuit and therefore less feedback signal. In this circuit as described above in practice the load current would be a pulsating DC whose ripple content is determined by the amount of energy storage capacity of the choke coil 10.

With respect to the current path 35 across the lamp 1 it is pointed out that if transformer 16 has sufficient voltage the SCR will continue to advance until the arc fires since the system is a voltage compliance system. In order not to require an excessively high voltage output of transformer 16 simply to provide an initial high arc starting voltage, the system can be biased on at any level while working into the short circuit provided by the closed relay contact 36. When switch 38 is closed to energize the relay coil 37 and thereby opening the normally closed contact 36 the discharging stored energy across the relay contacts provides a high voltage surge that breaks down the lamp and strikes the arc.

While the input control to the control unit 22 has been illustrated as being a manual dial input adjustment of a potentiometer 28, it is pointed out that other forms of input control may be used and such might include an electro-mechanical potentiometer drive or an analog computer input to the sum point, SP, for cyclic programming control or the output of a low frequency square or sine wave generator being fed to the sum point, SP, for variable frequency flashing or cycling.

It is pointed out that the choke coil 10 is not a current limiter nor are there any current limiting resistors employed as would be required in a conventional DC system. The choke coil 10 serves only as an integrator or energy storage bank to power the lamp and in effect provides the lamp with a current source where the voltage complies as opposed to a voltage source where the current complies.

It should be noted that in the event the 117 volt AC power source indicated at 6 should increase or decrease, the control unit 2 would simply advance or retard the SCR firing angle and thereby maintain the load circuit current constant. It should also be noted that the primary AC power source could be any voltage or frequency level that suitable system components can accommodate.

In order to control the current flow through those load devices which are dependent upon gas discharge phenomena for their operation, only a fraction of the power required to operate the system must actually be controlled in order to control the current flow through the load device ranging from zero to a maximum powerable level. This is achieved due to the fact that such devices require a voltage sustaining level to maintain the arc once it has been fired. Referring again to FIGURE 2, the transformer 13 and the rectifier bridge 8 are now considered. The transformer 13 and bridge 8 supply a quantity of power to the load circuit which is always slightly less than the voltage drop across the components of the load circuit. This so-called sustaining voltage represents a large portion of the power required to operate the lamp. The lamp and other components in the load circuit will not operate until an additional voltage is supplied to the load circuits by the SCR 19 and transformer 16 to meet the required sustaining voltage. By way of example, if the transformer 13 and bridge 8 supply 90% of the initial power required to sustain operation of the arc lamp, it can be seen that the SCR 19 and transformer 16 need only supply an additional 10% of the required power in order to operate the lamp. The power supplied through the transformer 16 can be varied from zero to the maximum or minimum amount required. During this variation of the power supplied to the lamp the uncontrolled power supplied through the transformer 16 remains substantially constant. Then only a small portion of the total power supplied to the lamp is actually controlled by the SCR 19 which after reaching a maximum begins to decrease as the current increases. The control of this small portion of the total power controls the entire output of the lamp.

Thus, the circuit in FIGURE 2 essentially comprises the use of feed back control with a current source voltage compliance system controlling only a fraction of the power required for operation of a load device such as a gaseous arc lamp. One advantage of this system is that lumen output is maintained despite any variations in the primary power source and that controlled arc currents ranging from zero (when the lamp is extinguished) to several times conventional current limited ratings can be achieved with a corresponding higher than rated lumen output of the lamps employed providing the bulb temperature and internal vapor pressure remains relatively constant.

In higher voltage-lower current systems such as might be used for driving glow discharge devices, such as a neon lamp, it may be more desirable to employ an AC system rather than a DC system. It is pointed out that the operation of the lamp in FIGURE 2 was with direct current. To operate such a lamp with alternating current no energy storage choke would be required and the rectifier bridges 8 and 9 and polarity reversing switch 7 could be eliminated. In place of transformers 13 and 16 special transformers with a square wave output characteristic would be employed in order to minimize the switching time from positive to negative half cycles. The amplitude of the uncontrolled voltage as supplied through the transformer corresponding to transformer 13 would be slightly less than the required sustaining voltage and the controlled voltage added by the transformer corresponding to transformer 16 would be added in phase relationshsip with the uncontrolled AC (square wave) voltage. For optimum operation the controlled voltage should be amplitude modulated rather than using on-off phase control techniques. However, phase control techniques might be employed for further processing of the phase control voltage ouptut into a controllable square wave level for adding to the uncontrolled voltage.

Feed back techniques similar to those described above would be employed to increase the amplitude of the controlled voltage to increase the load circuit current flow or to decrease the amplitude of the controlled voltage to decrease the load circuit current flow.

Figures 4, 4A:
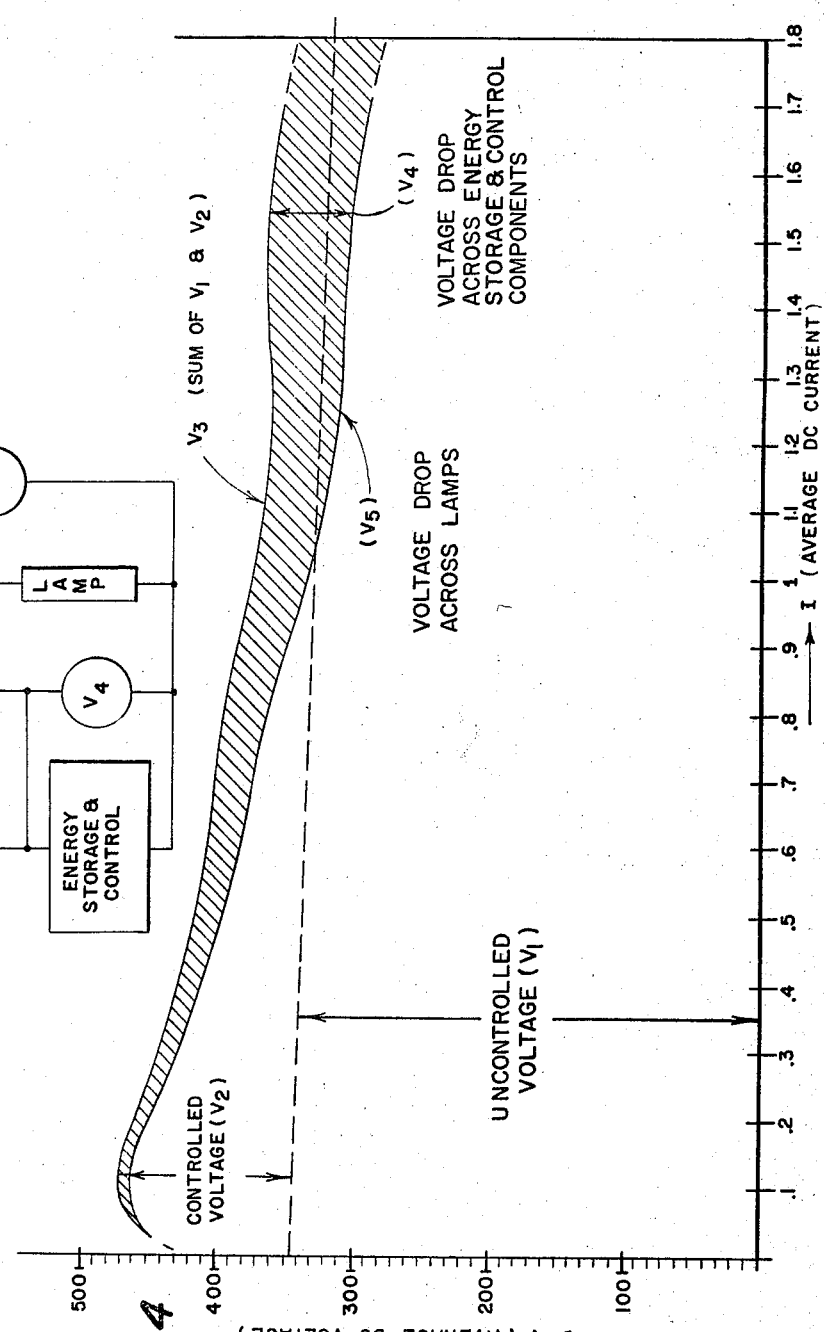
FIGURE 4 shows graphically the volt-ampere characteristic of a current source fluorescent drive system.
FIGURE 4A shows schematically where the voltages graphically illustrated in FIGURE 4 were measured.

Proceeding next to FIGURES 4 and 4A, FIGURE 4 shows a plot of the average volt-ampere characteristics of (2) General Electric F96PG–17CW lamps connected in series as schematically illustrated in FIGURE 4A. FIGURE 4A further illustrates the voltage across portions of the circuit which voltages are indicated in the plot of FIGURE 4.

The graph of FIGURE 4 is a plot of the (2) 96″ lamps whose normal current rating is set by the manufacturer at 1500 milliamperes AC. Tests have indicated that to achieve the corresponding AC lumen output utilizing a DC current, 900 milliamperes average DC current is required. The current plot of FIGURE 4 is the average DC current showing an approximate 100% over current drive at the high end. From zero to corresponding rated current (0.9 ampere DC) the IR drop of the energy storage and control components ranges from zero to about 35 volts of the 400 volts total required by the entire load circuit. This drop indicates a highly efficient system when compared with conventional AC ballasted systems or conventional DC drive systems where a resistance ballast is required and which often dissipates as much as 50% of the load circuit power. Any number of lamps can be added to the lamp series circuit by simply adding sufficient uncontrolled and controlled power capacity in accordance with the teachings of this invention.

The plot of FIGURE 4 further illustrates the lamp voltage ($V_5$) and control voltage ($V_4$) as well as the respective portions of the controlled voltage ($V_2$) and uncontrolled voltage ($V_1$) making up the total voltage ($V_3$) delivered by the two rectifiers as illustrated in FIGURE 2. As long as the $V_1$ voltage never exceeds voltage $V_3$ the lamps will not operate. Control of currents over the entire range is accomplished by the controlled adding of voltage $V_2$ to voltage $V_1$.

Proceeding next to FIGURE 6, there is shown an arrangement of 10 fluorescent lamps connected in series which are driven by a system according to the present invention. In this arrangement there are (10) General Electric F48PG–17CW fluorescent lamps L1–L10 connected in series as shown. Each lamp has a pair of filaments with the filaments being independently heated by the filament transformers FT–1 through FT–11 as shown and in a manner as previously described. The lamps are connected in pairs as shown and the system as illustrated can operate any desired pair of lamps or any desired combination of the five pairs of lamps. Across each pair of lamps is an electrical lead 45 to 49 which provides a current path across each pair of lamps. Each current path has a pair of normally closed relay contacts 50 and 51 therein which are energized to the open position by lamp relays LR–1 through LR–5. The lamp relays are energized by rectifier bridges 52 through 56 which are connected across the secondary windings 39 and 57 of the transformer 40. Switches S1 through S5 are connected with the relays 52 through 56, respectively, for energizing the same.

The lamp relays LR1 through LR5 also energize normally open relay contacts 58 through 62 which are connected across the rectifier bridges 63 through 67 which energize the transformer relays TR1 through TR5.

LT1 through LT5 are a plurality of five uncontrolled power transformers, each transformer corresponding to a pair of lamps. The primaries of the transformers LT-1 through LT-5 are indicated at 68 through 72 and are connected across a suitable AC source derived from an auto-transformer 73 as shown. Each of these primary windings has an international rectifier "Klip-Cel" indicated as KC connected across to filter out transients. There are also connected in the primary normally open relay contactors which are energized by the respective transformer relays TR-1 through TR-5.

Each of the transformers LT-1 through LT-5 are provided with secondary windings which are connected as shown across rectifier bridges B-3 through B-12. The bridges B-3 through B-7 are connected in series and the bridges B-8 through B-12 are also connected in series with the two sets of series connected bridges being connected in parallel and across one side of a polarity reversing arrangement indicated generally at 74 and comprising 2 relays PR-1 and PR-2 and a sequence type relay SR-1. Each time the power is turned off the sequence relay SR-1 opens one pair and closes another pair of SR-1 relay contacts so when the power is restored, the alternate PR relay is selected for closure so the polarity is reversed. As a result the polarity to the load circuit consisting of the energized pairs of lamps is reversed each time the system is turned off. If desired, suitable timing motors and switching arrangements can be added to automatically turn the system on and off at pre-determined intervals of time if the system is to be used continuously.

The controlled power is supplied to the load circuit through the transformer CT-1 and the rectifier bridges B-2 and B-13 which are connected to the secondaries of this transformer and are energized through the transformer primary 75 to a controlled arrangement similar to that described for the system of FIGURE 2.

Each of the transformer relays TR-1 through TR-5 utilizes a full wave bridge in order to convert the 18 volt nominal AC voltage from transformer 40 to 12 volts DC (nominal) which is the rating of the relay coils employed in this system. These bridges are relatively inexpensive and in this manner the relay coil acts as an energy storage component and accordingly eliminates the need for a filtered DC supply.

The system of FIGURE 6 operates in essentially the same manner as the system of FIGURE 2 in that the uncontrolled voltage supplied to a selected pair or pairs of lamps is slightly below that required to sustain the lamps in operation. It is only when a sufficient amount of controlled voltage is supplied to these pairs of lamps that the lamps begin to operate. If it desired, for example, to operate lamps L-3 and L-4 the switch S-2 is closed thereby energizing relay LR-2 and opening the normally closed relay contractors in current path 46 so that the current path is through lamps L-3 and L-4. With the lamps L-3 and L-4 in the load circuit, an increase in voltage is required. Simultaneously during the energization of LR-2 normally open contacts are closed to energize the relay TR-2 which closes its normally open contacts in the connection to primary 69 whereby the AC power source is connected to the primary of the transformer LT-2. This adds an increment of uncontrolled voltage to the system. The controlled voltage to the system which may be varied in order to adjust the arc current and hence the lumen output of the lamps L-3 and L-4 is then controlled in a manner as previously described.

The normally closed contacts on the lamp relays LR-1 through LR-5 have a ferrite magnet mounted adjacent thereto in order to extinguish the arc across the contacts which is sometimes caused by opening the contacts when currents over 300 milliamps are flowing through the circuits. In addition, this normally open contact has a slight delay so that the normally closed contacts are opened before the corresponding AC transformer voltage increment is added to the load circuit.

The auto-transformer 73 is provided since the output voltage of the transformers LT-1 through LT-5 was higher than that required, thereby necessitating a means for stepping down this voltage.

The system of FIGURE 6 is susceptible of a number of applications, only one of which will be mentioned below. The pairs of lamps connected as shown in FIGURE 6 may be different colored fluorescent lamps each having a separate current control unit and the five pairs covered by a suitable light diffuser. Thereby controlling the output of the different colored pairs of lamps not only provides a variable illumination light source, but the multiple controls readily provide a means for varying the spectral distribution of the radiant energy emanating from the five pairs and thereby achieving a different spectral distribution or color hue in the atmosphere in which the lights are mounted. Such colored lighting effects may be useful in the theatre or the growing of plants by artificial light and for numerous other purposes.

It is pointed out that many gaseous arc lamps are available that radiate varying amounts of light and radiated energy identified by its spectrum characteristic. For example, a fluorescent lamp with a zinc silicate phosphor coating emits light in the 460–640 millimicron wave length range with its peak emission at 525. A cadmium borate coated fluorescent lamp emits light in the 520–750 millimicron wave length range peaking at 615 and a barium strontium coated fluorescent lamp emits light in the 310–450 millimicron wave length range with a peak at 360. If the emitted light from these three lamps having predominant green, pink and blue light components were combined in a group and the light diffused, the combined spectrum distribution curve would exhibit a new color hue or shade related to the added or mixed color components. Thus, by increasing or decreasing the current through selected ones of the colored fluorescent lamps the amount of a particular lamp's light or radiant energy component can be increased or decreased resulting in an infinitely variable method for varying the spectral distribution and lumen level, and hence the color and intensity. Thus the combination light source is infinitely variable. In this respect it is pointed out that the colors achieved by this system are accomplished by the adding of color spectra rather than the subtraction of color spectra which is the result of the use of filters.

The present invention is particularly applicable to the field of plant and cell growth by artificial light since this application requires the use of large numbers of high energy level lamps whose output levels may be slowly changed and/or maintained related to time. Fluorescent lamps are mainly used in this application since, except for an insufficiency of red and infrared radiation, such lamps have the color spectrum components desirable for plant growth. Accordingly, banks of closely spaced fluorescent lamps with an occasional incandescent lamp interspersed to add a high red spectral component are employed in plant growth applications. Because a large portion of the high amount of energy output of these lamps is dissipated a heat in a small area, heat conduction and conduction problems arise. However, in the present system motors or other devices for cooling these local areas may be connected in series with the fluorescent lamps. Thus the controlled current to the fluorescent lamps also would proportionately control the current to other components, i.e., incandescent lamps or cooling devices placed in the series connection. The number or types of lamps or components in a given system would depend only upon the upper limit of power handling capability of the control components employed and the proper controlled-uncontrolled power balance.

The only system change for additional lamps and other electrical devices would be to insure the proper amount of uncontrolled lamp voltage furnished by the uncontrolled transformer(s) and bridge(s) in proper series or phase relationship, plus any increased choke or energy storage capacity required, and an assurance that the controlled power transformer has sufficient power range to add any lamp controlled power plus any power required for additional components over the desired control range.

Suitable relay logic can be added to turn off any particular lamp or other load device by disconnectijng an appropriate quantity of uncontrolled lamp transformer power so that its voltage does not exceed the arc sustaining voltage of the system. This simultaneously would provide a disconnect and current path around the component disconnected to keep the series circuit closed.

Suitable logic may also be supplied to the comparator and control units so that the fluorescent lamps may be turned on and off in a particular time cycle. The repetitive turning on and off (flashing or cycling) of fluorescent lamps is of considerable value in numerous applications.

It is therefore apparent that a simple yet positive and highly efficient apparatus and method has been disclosed for controlling the quantity and other characteristics of the outputs of gaseous arc discharged lamps and other load devices over a wide operating range.

It will be understood that this invention is susceptible to modification in order to adapt it to different usages and conditions and, accordingly, it is desired to comprehend such modifications within this invention as may fall within the scope of the appended claims.

What is claimed is:

1. An apparatus for controlling current flow to a load device independently of the electrical resistance characteristics thereof, said load device having pulsating DC flowing therethrough, said apparatus comprising polarity reversing means having one side connected across said load device, a full wave rectifier and an energy storage choke in series therewith connected across the other side of said polarity reversing means, a transformer having its secondary connected across said full wave rectifier and its primary connected across a source of AC electrical energy, means connected electrically with said primary for controlling the flow of electric power thereto, and a feedback signal sensing network in electrical circuit relation with said choke and connected to said control means to regulate the power supplied to said primary in response to the current flow in said load device.

2. An apparatus as claimed in claim 1 wherein said control means includes a silicon control rectifier connected to the output thereof.

3. An apparatus as claimed in claim 1 wherein said control means includes means for controlling said electric current flow to the load device in response to a programmed input.

4. An apparatus for controlling current flow to a load device independently of the electrical resistance characteristics thereof, the load device having pulsating DC flowing therethrough, said apparatus comprising a full wave rectifier and a choke in series therewith connected across said load device, a transformer having its secondary connected across said full wave rectifier and its primary connected across a source of AC electrical energy, means connected electricallly with said primary for controlling the flow of electric power thereto, and a feedback signal sensing network in electrical circuit relation with said choke and connected to said control means to regulate the power supplied to said primary in response to the current flow in said load device.

5. An apparatus for controlling current flow to a load device independently of the electrical resistance characteristics thereof, the load device having pulsating DC flowing therethrough, said apparatus comprising, polarity reversing means having one side connected across said load device, a full wave rectifier and an energy storage choke in series therewith connected across the other side of said polarity reversing means, a transformer having its secondary connected across said full wave rectifier and its primary connected across a source of AC electrical energy, a silicon control rectifier bridge having one side connected in series with said primary, means connected to a source of AC electrical energy and having its output connected across the other side of said silicon control rectifier bridge for controlling the flow of electric power to said primary winding, and a feedback signal sensing network in electrical circuit relation with said choke and connected to said control means to regulate the power supplied to said primary in response to the current flow in said load device.

6. An apparatus as claimed in claim 5 and further comprising a second feedback signal sensing network responsive to the output of said load device and connected to said control means to regulate the power supplied to said primary in response to the output of said load device.

7. An apparatus for controlling electric current in a gas discharge device and comprising a gaseous arc lamp having a pair of filaments therein, a pair of transformers connected across an AC source and respectively connected to said filaments to heat the same, polarity reversing means having one side connected across said lamp, a first full wave rectifier having one side connected across the other side of said polarity reversing means, a first transformer having its primary connected across AC source and its secondary across the other side of said first full wave rectifier, said first rectifier and transformer supplying to said lamp a quantity of power below the level of power required to sustain the arc in said lamp, a second full wave rectifier having one side in series with said one side of said first rectifier, a second transformer having its primary connected across an AC source and its secondary across the other side of said second rectifier, an energy storage choke in series with said first and second rectifiers, means connected across an AC source and having its output connected to said second transformer primary for controlling the power supplied thereto, and a feedback signal sensing network in electrical circuit relation with said choke and connected to said control means to regulate the power supplied to said second transformer primary in response to the arc current flow in said lamp.

8. An apparatus as claimed in claim 7 and further comprising a second feedback signal sensing circuit responsive to the output of said lamp and connected to said control means to regulate the power supplied to said second transformer primary in response to the output of said lamp.

9. An apparatus for controlling electric current in a gas discharge device and comprising a gaseous arc lamp having a pair of filaments therein, polarity reversing means having one side connected across said lamp, a first full wave rectifier having one side connected across the other side of said polarity reversing means, a first transformer having its primary connected across AC source and its secondary across the other side of said first full wave rectifier, said first rectifier and transformer supplying to said lamp a quantity of power below the level of power required to sustain the arc in said lamp, a second full wave rectifier having one side in series with said one side of said first rectifier, a second transformer having its primary connected across an AC source and its secondary across the other side of said second rectifier, an energy storage choke in series with said first and second rectifiers, and a feedback signal sensing network in electrical circuit relation with said choke and connected to said control means to regulate the power supplied to said second transformer primary in response to the current flow in said lamp.

10. An apparatus for controlling electric current in a gas discharge device and comprising a gaseous arc lamp having a pair of filaments therein, a pair of transformers connected across an AC source and respectively connected to said filaments to heat the same, polarity reversing means having one side connected across said lamp, a first full wave rectifier having one side connected across the other side of said polarity reversing means, a first transformer having its primary connected across AC source and its secondary across the other side of said first full wave rectifier, said first rectifier and transformer supplying to said lamp a quantity of power below the level of power required to sustain the arc in said lamp, a second full wave rectifier having one side in series with said one side of said first rectifier, a second transformer having its primary connected across an AC source and its secondary across the other side of said second rectifier, an energy storage choke in series with said first and second rectifiers, and means connected across an AC source and having its output connected to said second transformer primary for controlling that portion of the power supplied to said lamp through said second transformer whereby the output of the lamp is regulated by controlling a portion of the power supplied thereto.

11. An apparatus as claimed in claim 9 and further comprising a circuit across said lamp providing a current path around said lamp and including a normally closed relay, and means for energizing said relay to the open position so that a high voltage surge is provided whereby an arc is struck across said lamp to ignite the same.

12. An apparatus as claimed in claim 9 wherein the load current through said lamp is pulsating direct current.

13. An apparatus for controlling electric current in a gas discharge device and comprising a gaseous arc lamp having a pair of filaments therein, polarity reversing means having one side connected across said lamp, a first full wave rectifier having one side connected across the other side of said polarity reversing means, a first transformer having its primary connected across AC source and its secondary across the other side of said first full wave rectifier, said first rectifier and transformer supplying to said lamp a quantity of power below the level of power required to sustain the arc in said lamp, a second full wave rectifier having one side in series with said one side of said first rectifier, a second transformer having its primary connected across an AC source and its secondary across the other side of said second rectifier, an energy storage choke in series with said first and second rectifiers, a silicon control rectifier bridge having one side thereof connected in series with said second transformer primary, means connected to a source of AC electrical energy and having its output connected across the other side of said silicon control rectifier bridge for controlling the flow of electric power to said second transformer primary, and a feedback signal sensing network in electrical circuit relation with said choke and connected to said control means to regulate the power supplied to said second transformer primary in response to the arc current flow in said lamp.

14. An apparatus for controlling electric current in a gas discharge device and comprising a gaseous arc lamp having a pair of filaments therein, polarity reversing means having one side connected across said lamp, a first full wave rectifier having one side connected across the other side of said polarity reversing means, a first transformer having its primary connected across AC source and its secondary across the other side of said first full wave rectifier, said first rectifier and transformer supplying to said lamp a quantity of power below the level of power required to sustain the arc in said lamp, a second full wave rectifier having one side in series with said one side of said first rectifier, a second transformer having its primary connected across an AC source and its secondary across the other side of said second rectifier, an energy storage choke in series with said first and second rectifiers, a silicon control rectifier connected in series with the unfiltered output of said second full wave rectifier, a diode in parallel with said silicon control rectifier and said second full wave rectifier output, means connected across an AC source and having its output connected to said silicon control rectifier and diode for controlling the output of said second full wave rectifier and thereby the input to said lamp, and a feedback signal sensing circuit in electrical circuit relation with said choke and connected to said control means to regulate the input to said lamp in response to the current flow in said lamp.

15. An apparatus for controlling alternating current through a gaseous arc lamp and comprising first and second transformers having a square wave output characteristic and having their secondary windings connected in series and across said lamp, the primaries of said first and second transformer being connected to an AC source, means connected across an AC source and having its output connected to the primary of said second transformer for controlling the power supplied thereto, and a feedback signal sensing circuit in the input circuit to said lamp and connected to said control means to regulate the power supplied to said second transformer primary in response to the alternating arc current flow in said lamp.

16. An apparatus for controlling electric current in a gas discharge device and comprising a gaseous arc lamp having a pair of filaments therein, polarity reversing means having one side connected across said lamp, a first full wave rectifier having one side connected across the other side of said polarity reversing means, a first transformer having its primary connected across AC source and its secondary across the other side of said first full wave rectifier, said first rectifier and transformer supplying to said lamp a quantity of power below the level of power required to sustain the arc in said lamp, a second full wave rectifier having one side in series with said one side of said first rectifier, a second transformer having its primary connected across an AC source and its secondary across the other side of said second rectifier, an energy storage choke in series with said first and second rectifiers, means connected across an AC source and having its output connected to said second transformer primary for controlling the power supplied thereto so that the output of said full wave rectifiers to said lamp rises and falls above the level of power required to sustain the arc in said lamp whereby said lamp is flashed on and off at a predetermined frequency and amplitude, and feedback signal sensing network in electrical circuit relation with said choke and connected to said control means to regulate the power supplied to said second transformer primary in response to the arc current flow in said lamp.

17. An apparatus for controlling electric current in a plurality of gas discharge devices and comprising, a plurality of series connected gaseous arc lamps, a normally closed circuit around each of said lamps, means for selectively opening said lamp circuits, polarity reversing means having one side connected across said lamp circuits, a plurality of full wave rectifiers corresponding in plurality to said lamps and having corresponding one sides thereof connected across the other side of said polarity reversing means, a like plurality of first transformers with the primaries thereof being connected across an AC source and the secondaries thereof across the respective other sides of said full wave rectifiers, means for energizing said first transformer primaries simultaneously with the opening of corresponding lamp circuits to supply a predetermined electric current to said certain lamps, a second full wave rectifier having one side thereof in series with said one sides of said first rectifiers, a second transformer having its primary connected across an AC source and its secondary across the other sides of said second rectifiers, an energy storage choke in series with said one sides of said first and second rectifiers, means connected across an AC source and having its output connected to said second transformer primary for controlling the power supplied thereto and thereby the controlled current to said certain lamps, and a feedback signal sensing circuit in electrical circuit relation with said choke and connected to said control means to regulate the power supplied to said second transformer primary in response to the arc current flow in said lamps.

18. An apparatus as claimed in claim 17 wherein pairs of lamps are connected in series with said lamp circuits being across each pair of series connected lamps whereby pairs of lamps may be selectively ignited and the output of said pairs of lamps be controlled.

19. An arrangement for the growth of plant and cell life by artificial light and comprising an enclosing housing the plant life which is to be grown, a bank of lights positioned above said plant life to provide a source of light energy, and means connected to said bank of lights and an AC source for controlling the current flow to said bank independently of the electrical resistance characteristics of the lights whereby the light output of the lamps is regulated.

20. An apparatus for controlling electric current in a load device, first means for supplying a first voltage less than the voltage required to operate the load device, second means for supplying an additional voltage, circuit means connecting said first and second means and the load device to add the voltages supplied thereby, and control means connected with said second means for controlling the power supplied thereto whereby the operation of the load device is controlled by regulation of the additional voltage supplied by said second means.

21. An apparatus according to claim 20 and further including feedback circuit means for sensing the current in said circuit means and regulating said control means in accordance therewith.

22. An apparatus for controlling current flow to a load device independently of the electrical resistance characteristics thereof, the load device having pulsating DC flowing therethrough, said apparatus comprising polarity reversing means having one side connected across said load device, a full wave rectifier and an energy storage choke in series therewith connected across the other side of said polarity reversing means, a transformer having its secondary connected across said full wave rectifier and its primary connected across a source of AC electrical energy, a silicon control rectifier bridge having one side connected in series with said primary, means connected to a source of AC electrical energy and having its output connected across the other side of said silicon control rectifier bridge for controlling the flow of electric power to said primary winding, and a feedback signal sensing network responsive to at least one output of said load device and connected to said control means to regulate the power supplied to said primary in response to the output of said load device.

23. An apparatus of the class described comprising a bank of lights each having predetermined spectral characteristics and means electrically connected with said lights for independently varying the current flow through the lights and thereby vary the quantity of light emitted in any given spectral region so that the combined quantity and spectral characteristics of the bank of lights is varied.

References Cited

UNITED STATES PATENTS

| 2,961,579 | 11/1960 | Roney et al. | 315—170 |
| 3,102,971 | 9/1963 | Cvadra et al. | 315—171 |
| 3,143,701 | 8/1964 | Bird | 315—291 |
| 3,249,799 | 5/1966 | Powell | 315—311 X |
| 3,323,013 | 5/1967 | Lord | 315—100 |
| 3,344,311 | 9/1967 | Nuckolls | 315—100 |
| 3,354,384 | 11/1967 | Benjamin | 315—311 X |
| 3,365,648 | 1/1968 | Benjamin | 315—171 X |

JOHN W. HUCKERT, *Primary Examiner.*

R. F. POLISSACK, *Assistant Examiner.*

U.S. Cl. X.R.

315—100, 160, 164, 170, 171, 175, 176, 299, 300, 307, 311